March 22, 1955     A. F. DAVIS     2,704,682

EXPANSIBLE COUPLING DEVICE

Filed Nov. 27, 1950

INVENTOR.
ARTHUR F. DAVIS

BY

ATTORNEYS.

United States Patent Office 2,704,682
Patented Mar. 22, 1955

2,704,682

EXPANSIBLE COUPLING DEVICE

Arthur F. Davis, Elyria, Ohio, assignor, by mesne assignments, to The Colson Corporation, Elyria, Ohio, a corporation of Ohio Application November 27, 1950, Serial No. 197,672

1 Claim. (Cl. 287—126)

This invention relates to attaching and securing means used to attach casters and the like to hollow tubular members such as furniture legs, and more particularly to improvements in so-called caster adapters which are adapted to expand against the inner surfaces of the tube to which the caster is attached.

It is an object of my invention to provide an adapter which has a wide range of adjustment and which is therefore adaptable for use in tubes of varying diameters. Another object of my invention is to provide an expansible adapter which is simple in design and construction, efficient in use and economical to manufacture. Another object of my invention is to provide an expansible adapter which applies relatively large gripping and securing forces over wide areas on the inner surface of the tube for securely retaining the caster assembly on the end of the tube in such a manner that it is capable of withstanding shocks and strains normally encountered in use without appreciably loosening the connection. A further object is to provide an adapter for casters and the like which is easy to install and remove and adjust in operative position on the tube.

Figure 1:
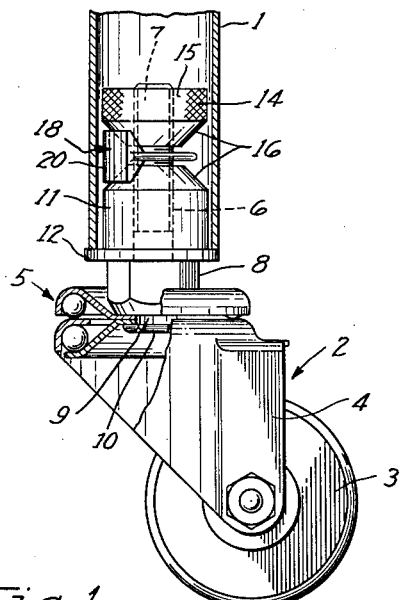
Figure 2:
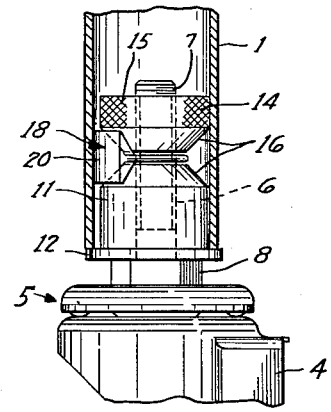
Figure 3:
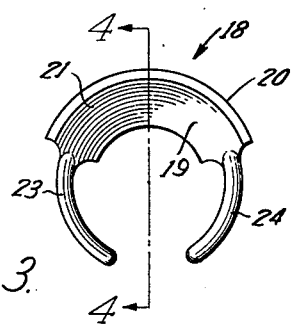
Figure 5:
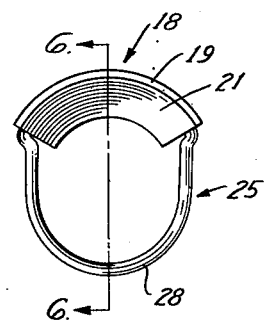
Figure 4:
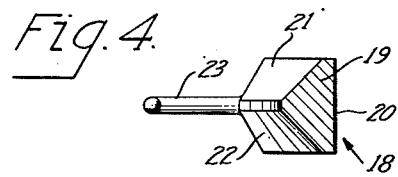
Figure 6:
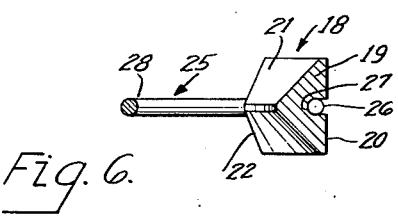

These and other objects of my invention will appear from the following description of a preferred form thereof, reference being had to the accompanying drawings in which Figure 1 is a fragmental elevation view of the caster assembly and adapter positioned with respect to the tube and before the adapter is tightened within the tube, a portion of the parts being cut away to show details of construction; Figure 2 is a fragmental elevation view similar to Figure 1 and showing the adapter parts in secured, locked and gripping relation with the tube; Figure 3 is a plan view of one of the wedge elements which constitutes a part of my invention; Figure 4 is a vertical section taken on the line 4—4 of Figure 3; Figure 5 is a plan view showing an alternate form of one of the parts of the adapter; and Figure 6 is a section taken on the line 6—6 of Figure 5.

Referring now to the drawings, reference character 1 denotes a hollow tubular member such as a furniture leg to which the caster assembly 2 comprising a caster wheel 3, a bracket 4 and enclosed bearing means 5 to permit swiveling of the caster bracket with respect to the tube, is adapted to be attached for supporting same. The structure of the caster assembly is well known in the art and since it does not constitute a part of the present invention, no further description of it is deemed necessary.

Projecting upwardly from the caster assembly is a caster stem 6 which is adapted to extend into the open end of the member 1. The stem 6 is threaded on its upper portion as indicated at 7 to engage and actuate vertical movement of the upper wedge element 14 as will appear below. An enlarged head 8 preferably formed integral with stem 6 and located at its lower end, facilitates turning of the stem through engagement therewith and turning by a suitable tool. Projecting from the bottom of the head 8 is a stud 9 on which bracket 4 and bearing means 5 are pivotally mounted and secured against vertical movement by suitable retaining means 10.

Fitted on the upper portion of stem 6 above the enlarged head 8 are a lower wedge element 11 and an upper wedge element 14, as shown in Figures 1 and 2. These wedge elements preferably have curved outer surfaces which conform to and are adapted to engage the inner surfaces of the tubular member 1 and are slightly less in diameter than the internal diameter of member 1. The lower wedge element 11 is bored out so as to fit loosely on stem 6 and is formed with an annular flange 12 on one end thereof which is adapted to engage the bottom edge of the member 1 to limit the depth of insertion of the element 11 into the pocket of the tubular member when the caster is being fastened in position. The upper wedge element 14 is knurled on its outer surface 15 to enhance the gripping action of same on member 1 and is centrally drilled and tapped so as to engage the stem threads 7 and move axially of the stem when same is turned. In other details, wedge elements 11 and 14 are substantially the same and therefore like reference characters will denote similar parts of these elements. The inner and mutually facing ends of the mounted wedge elements 11 and 14 are frusto-conically shaped as shown at 16 and thus present continuous inwardly converging surfaces having the same angle of incline, preferably about 45°, with respect to the vertical axes of the wedge elements. When the stem 6 is rotated or turned about its longitudinal axis and with respect to upper wedge 14, the latter will move axially toward the lower wedge 11 by action of the threads so that the inclined surfaces 16 are spaced progressively closer together.

An intermediate wedge piece 18 shown in Figures 3 and 4 which is adapted to coact with the upper and lower wedges 11 and 14 as will be explained below is mounted concentrically of the stem between the upper and lower wedge elements 14 in the manner shown in Figures 1 and 2. Wedge piece 18 consists of a main body portion 19 which extends only partially around the stem so as to lie on one side of a plane through the axis of the stem and whose outer surface 20 is semi-cylindrical in shape so as to conform generally to the curvature of the internal surface of the tubular member 1. The interior portions of the main body 19 are formed to provide two partial frusto-conically shaped surfaces 21 and 22 which converge inwardly toward each other. The slope of surfaces 21 and 22 with respect to the axis of stem 6 is substantially the same as the slope of the surfaces 16 on wedges 11 and 14, that is approximately 45°. Arcuately shaped fingers 23 and 24 formed integrally with and extending from each side of the main body portion 19 loosely encircle the stem 6 to locate wedge piece 18 thereon during initial assembly of the adapter. An alternate means of positioning wedge piece 18 on the stem 6 is shown in Figure 5 wherein a spring-like ring 25 split as indicated at 26 is seated in an annular groove 27 on the periphery of wedge body 19 and extends therefrom in a continuous loop 28 around the stem 6.

The caster is assembled with the tubular member or leg 1 in the following manner: the lower wedge 11 and the intermediate wedge piece 18 are mounted on stem 6 in that order, the frusto-conically shaped end 16 of the lower wedge facing upwardly and engaging the conical surface 22 of the wedge piece. Thereafter, upper wedge 14, with its inclined surface 16 facing downwardly, is screwed down on the stem manually until the ends 16 of the respective wedges 11 and 14 are spaced apart by an amount sufficient to permit the wedge piece 18 and the upper and lower wedges to enter the pocket of the member when the stem 6 is inserted thereinto as shown in Figure 1. It will be noted that the diameters of the respective wedges 11 and 14 are less than the internal diameter of the member 1 so that the assembled parts on the stem 6 may be rapidly and easily inserted into member 1. The stem 6 preferably is positioned in the pocket so that the outer knurled surface of upper wedge 14 lightly engages the interior of member 1 to effect sufficient friction therebetween to prevent turning of wedge 14 on stem 6 when the latter is rotated to tighten the assembly. When the stem and wedge parts are fully inserted in the pocket with flange 12 on wedge 11 abutting the bottom edge of member 1, the stem is rotated by means of a nut or head 8 which causes wedge 14 to move down the stem into engagement with wedge piece 18, that is, the inclined end surface 16 on wedge 14 engages the corresponding conical surface 21 on wedge piece 18. Further turning of the stem causes wedge piece 18 to move outwardly from the stem by reason of the squeezing or wedging of same between the inclined surfaces 16 on the upper and lower wedges, until the peripheral surface 20 on the wedge piece engages and presses against the internal surface of member 1. At the same time, the outer surfaces of wedges 11 and 14 are moved and pressed by the reaction forces against diametrically opposite portions of the inner surface of member 1. Further turning of the stem effects a tight uniform gripping action between the wedges and wedge piece and the member 1 which securely binds the caster to the member 1 as shown in Figure 2.

In order to remove the caster from the member 1, the reverse procedure is followed, namely, head 8 is rotated so as to move the upper wedge element away from the lower wedge element, thereby releasing the gripping pressure of these elements on the side wall of the member 1 and permitting same to be removed from the bottom of the tube.

Various modifications, changes and improvements to my adapter will occur to those skilled in the art from the above description and drawings of a preferred embodiment of my invention without departing from the spirit and scope thereof. Therefore I do not wish to be limited to the particular construction disclosed, the essential features of my invention being defined and embraced in the appended claim.

I claim:

An expansible coupling device for securing a stem to a hollow tubular member, a threaded stem adapted to be disposed within a hollow tubular member, said expansible coupling device comprising a lower wedge element with a substantially cylindrical outer surface of uniform length and frusto-conically shaped upper end surface and being loosely mounted on said stem, an internally threaded upper wedge element disposed concentrically on and engaging the threads on said stem and having a substantially cylindrical outer surface of uniform length and a frusto-conically shaped lower end surface, the diameters of the cylindrical surfaces of said lower and upper wedge elements being slightly less than the inside diameter of the tubular member with which the device is to be used, a single intermediate wedge piece having an outer surface corresponding to that of a segment of a cylindrical surface with an arcuate length of less than 180° and having upper and lower frusto-conically shaped end surfaces converging inwardly toward each other from said arcuate surface, said end surfaces on said intermediate piece being complementary to and being slidably engaged with the frusto-conically shaped end surfaces of said upper and lower wedge elements, respectively, and retaining means carried by said intermediate wedge piece and extending therefrom and loosely encircling said stem for initially positioning said intermediate piece around said stem during assembly, said upper wedge element when held against rotation being movable toward said lower wedge element upon rotation of said stem in one direction, said end surfaces of said upper and lower wedge elements engaging said upper and lower surfaces, respectively, on said intermediate piece whereby to simultaneously urge said intermediate piece outwardly in one direction so as to bear tightly against said tubular member and said upper and lower wedge elements outwardly in the opposite direction so as to be forced into tight engagement with said member, the cylindrical surface on said upper wedge element being knurled for initially frictional engaging said tubular member whereby rotation of said upper wedge element is restrained when said stem is turned to tighten the coupling device.

References Cited in the file of this patent

UNITED STATES PATENTS

| | | |
|---|---|---|
| 1,223,877 | Hilfrank | Apr. 24, 1917 |
| 1,439,149 | Crandall | Dec. 19, 1922 |
| 1,461,767 | Weyrauch | July 17, 1923 |
| 1,752,742 | Johnson | Apr. 1, 1930 |
| 1,753,183 | Johnson | Apr. 1, 1930 |
| 1,953,636 | Skelton | Apr. 3, 1934 |
| 2,051,251 | Epstein | Aug. 18, 1936 |
| 2,179,912 | Woodruff | Nov. 14, 1939 |

FOREIGN PATENTS

| | | |
|---|---|---|
| 93,887 | Germany | Sept. 11, 1897 |